(12) United States Patent
Aggarwal

(10) Patent No.: US 8,582,554 B2
(45) Date of Patent: Nov. 12, 2013

(54) SIMILARITY SEARCHING IN LARGE DISK-BASED NETWORKS

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/091,244

(22) Filed: Apr. 21, 2011

(65) Prior Publication Data

US 2012/0269200 A1    Oct. 25, 2012

(51) Int. Cl.
*H04L 12/28* (2006.01)
*G06F 17/30* (2006.01)

(52) U.S. Cl.
USPC .......................................... 370/351; 707/737

(58) Field of Classification Search
USPC ............................. 370/351; 707/713, 737, 776
See application file for complete search history.

(56) References Cited

U.S. PATENT DOCUMENTS

| | | | |
|---|---|---|---|
| 2008/0275862 A1* | 11/2008 | Liu et al. ............................. | 707/5 |
| 2010/0150004 A1* | 6/2010 | Duffield et al. ................ | 370/252 |
| 2011/0074786 A1* | 3/2011 | Aggarwal ...................... | 345/440 |
| 2011/0313984 A1* | 12/2011 | Zhou et al. .................... | 707/704 |
| 2012/0254153 A1* | 10/2012 | Abraham et al. ............. | 707/716 |
| 2012/0259915 A1* | 10/2012 | Bhatt et al. .................... | 709/204 |

OTHER PUBLICATIONS

Anna Gilbert, "Compressing Network Graphs," Aug. 2004, Proceedings of the LinkKDD Workshop at the 10th ACM Conference on KDD.*

Korf, Richard E. "Linear-time disk-based implicit graph search." Journal of the ACM (JACM) 55.6 (2008): 26.*

Buehrer, Gregory, and Kumar Chellapilla. "A scalable pattern mining approach to web graph compression with communities." Proceedings of the international conference on Web search and web data mining. ACM, 2008.*

Berger et al. On the Spread of Viruses in the Internet. SODA, 2005.

Chakrabarti et al. Epidemic Thresholds in Real networks. ACM Trans. on Inf. Systems and Security, 10(4), 2008.

Brin et al. The Anatomy of a Large Scale Hypertextual Search Engine, WWW Conference, 1998.

Domingos et al. Mining the Network Value of Customers. ACM KDD Conference, 2001.

Freeman, Centrality in Social Networks: Conceptual Clarification. Social Networks, 1, pp. 215-239, 1979.

Kleinberg, Authoritative Sources in a Hyperlinked Environment. Journal of the ACM 46(5) pp. 604-632, 1999.

(Continued)

*Primary Examiner* — Dang Ton
*Assistant Examiner* — Ryan Kavleski
(74) *Attorney, Agent, or Firm* — Ryan, Mason & Lewis, LLP

(57) ABSTRACT

Techniques for determining a shortest path in a disk-based network are provided. The techniques include creating a compressed representation of an underlying disk resident network graph, wherein creating a compressed representation of an underlying disk resident network graph comprises determining one or more dense regions in the disk resident graph and compacting the one or more dense regions into one or more compressed nodes, associating one or more node penalties with the one or more compressed nodes, wherein the one or more node penalties reflect a distance of a sub-path within a compressed node, and performing a query on the underlying disk resident network graph using the compressed representation and one or more node penalties to determine a shortest path in the disk-based network to reduce the number of accesses to a physical disk.

20 Claims, 4 Drawing Sheets

(56) References Cited

OTHER PUBLICATIONS

Kumar et al. Trawling the web for emerging cyber-communities. WWW Conference, 1999.
Leskovec et al. Cost-Effective Outbreak Detection in Networks. KDD Conference, 2007.
Leskovec et al. Cascading Behavior in Large Blog Graphs, SDM Conference, 2007.
Newman et al. Email Networks and the Spread of Computer Viruses, Phys. Rev. E 66, 035101, 2002.
Newman, The Spread of Epidemic Disease on Networks, Phys. Rev. E 66, 016128, 2002.
Song et al. Modeling and Predicting Personal Information Dissemination Behavior. ACM KDD Conference, 2005.
Wang et al. Epidemic Spreading in Real Networks: An Eigenvalue Viewpoint, SRDS, pp. 25-34, 2003.
Wang et al. On Computer Viral Infection and the Effect of Immunization. ACM Annual Comp. Security App. Conf., 2002.
Wu et al. Information Flow in Social Groups, Physical A: Statistical and Theoretical Physics, vol. 337, Issues 1-2, 1, pp. 327-335, 2004.
Zou et al. Email Virus Propagation Modeling and Analysis, UMass Technical Report TR-CSE-03-04, 2004.
http://www.facebook.com, downloaded May 11, 2011.
http://www.linkedin.com, downloaded May 11, 2011.
Aggarwal et al., XProj: A Framework for Projected Structural Clustering of XML Documents, KDD Conference, 2007.
Agrawal et al., Efficient Maintenance of Transitive Relationships in Large Data and Knowledge Bases, ACM SIGMOD Conference, 1989, ACM, pp. 253-262.
Burdick et al., Mafia: A Maximal Frequent Itemset Algorithm, IEEE Trans. on Knowl. and Data Eng. V. 17, N. 11, p. 1490-1504, 2005.
Chakrabarti et al., R-MAT: A Recursive Model for Graph Mining, SDM Conference, 2004.
Cheng et al., Fast Computing Reachability Labelings for Large Graphs with High Compression Rate, EDBT Conference, 2008.
Cohen et al., Reachability and Distance Queries via 2-hop Labels, ACM Symposium on Discrete Algorithms, 2002.
Cook et al., Holder, Mining Graph Data, John Wiley & Sons Inc., 2007.
Dalvi et al., Keyword Search on External Memory Data Graphs, VLDB Conference, 2008.
Dijkstra, A Note on Two Problems in Connection with Graphs, Numerische Mathematik, 1 (1959), S. 269-271.
Faloutsos et al., On Power Law Relationships of the Internet Topology, SIGCOMM Conference, 1999.
Feigenbaum et al., Graph Distances in the Data Stream Model, SIAM Journal on Computing, 38(5), pp. 1709-1727, 2005.
Gibson et al., Discovering Large Dense Subgraphs in Massive Graphs, VLDB Conference, 2005.
Goldberg et al., Computing Point-to-Point Shortest Paths from External Memory, Alenex, 2005.
Goldman et al., Proximity Search in Databases, VLDB Conference, 1998.
Jin et al., Efficiently Answering Reachability Queries in very Large Directed Graphs, ACM SIGMOD Conference, 2008.
Kashima et al., Marginalized Kernels between Labeled Graphs, ICML, 2003.
Kudo et al., An Application of Boosting to Graph Classification, NIPS Conf. 2004.
Kumar et al., The Web as a Graph, ACM PODS Conference, 2000.
Papadias et al., Query Processing in Spatial Network Databases, VLDB Conference, pp. 802-813, 2003.
Raghavan et al., Representing Web Graphs, ICDE Conference, pp. 405-416, 2003.
Rattigan et al., Graph Clustering with Network Structure Indices, ICML, 2007.
Samet et al., Scalable Network Distance Browsing in Spatial Databases, ACM SIGMOD Conference, 2008.
Shekhar et al., CCAM: A Connectivity-Clustered Access Method for Networks and Network Computations, IEEE Trans. Knowl. Data Eng. (TKDE), 9(1):102-119, 1997.
Xiao et al., Efficiently Indexing Shortest Paths by Exploiting Symmetry in Graphs, EDBT Conference, 2009.
Wang et al., Dual Labeling: Answering Graph Reachability Queries in Constant Time, ICDE Conference, 2006.
Yan et al., CloseGraph: Mining Closed Frequent Graph Patterns, ACM KDD Conference, 2003.
Yan et al., Mining Significant Graph Patterns by Scalable Leap Search, SIGMOD Conference, 2008.
Yan et al., Graph Indexing: A Frequent Structure-based Approach, SIGMOD Conference, 2004.
Zaki et al., XRules: An Effective Structural Classifier for XML Data, KDD Conference, 2003.

\* cited by examiner

SIMILARITY SEARCHING IN LARGE DISK-BASED NETWORKS

FIELD OF THE INVENTION

Embodiments of the invention generally relate to information technology, and, more particularly, to database searching.

BACKGROUND OF THE INVENTION

Graph applications have been increasingly explored in recent years because of numerous structural applications in various industries. The graph mining problem has been studied in the context of a number of traditional data mining problems such as clustering, classification, and frequent pattern mining.

Existing approaches include pre-computing all-pairs' shortest paths and storing them for responses to queries. However, this is not a practical solution for large graphs, and can require significant storage. Further, such approaches may only assume value pre-stores and may not provide any idea of what the actual path might be in the underlying result. Pre-storage of actual paths requires resources which are several orders of magnitude greater.

SUMMARY OF THE INVENTION

Principles and embodiments of the invention provide techniques for similarity searching in large disk-based networks. An exemplary method (which may be computer-implemented) for determining a shortest path in a disk-based network, according to one aspect of the invention, can include steps of creating a compressed representation of an underlying disk resident network graph, wherein creating a compressed representation of an underlying disk resident network graph comprises determining one or more dense regions in the disk resident graph and compacting the one or more dense regions into one or more compressed nodes, associating one or more node penalties with the one or more compressed nodes, wherein the one or more node penalties reflect a distance of a sub-path within a compressed node, and performing a query on the underlying disk resident network graph using the compressed representation and one or more node penalties to determine a shortest path in the disk-based network to reduce the number of accesses to a physical disk.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
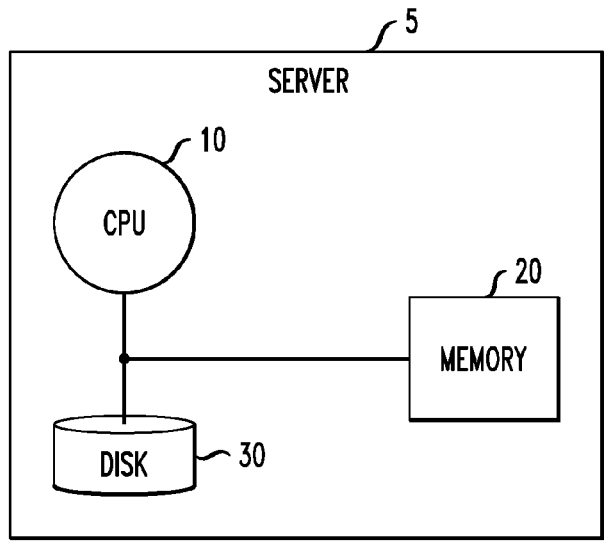
FIG. 1 is a diagram illustrating example architecture, according to an embodiment of the present invention.

Principles of the invention include similarity searching in large disk-based networks. One or more embodiments of the invention include using techniques to create a compressed version of a network (for example, using density based compression), which can be used for a disk-based nearest neighbor search. Algorithms are designed and used for the shortest path problem in massive disk-resident graphs, and one or more embodiments of the invention are implemented in the context of an underlying massive domain of nodes in a graph. Dense sub-graphs retain most of the edges in the underlying data set, but provide only a small portion of the underlying paths. Thus, the graph can be compressed by identifying such dense regions and leveraging them in order to obtain the shortest paths efficiently.

As detailed herein, node labels are typically key identifiers drawn across a very large universe of possibilities. For example, the node labels may correspond to uniform resource locator (URL) addresses in a web graph, the internet protocol (IP)-addresses in a communication network, or user identifiers in a social network. The edges in such a graph can be defined as patterns of activity over very small time windows.

In such a scenario, the underlying domain of nodes may be massive. Some examples of such cases are as follows:

A web graph is drawn on a massive domain of URL identifiers. The number of URL identifiers may range, for example, in the hundreds of billions. The number of edges (hyperlinks) is likely to be of the order of trillions.

Communication networks have nodes in which each node corresponds to an IP-address. The edges may correspond to routes on the network.

In social, wireless, messaging and phone networks, the communications between participants can be modeled as edges. In such cases, the number of nodes may occur in the millions, and the number of edges may be significantly larger.

An assumption used in one or more embodiments of the invention is that the underlying graphs are so large that they are disk resident. Such graphs pose significant challenges for query processing because the underlying structure cannot be systematically explored without causing random accesses to the underlying disk. Such random accesses can cause very slow running times in otherwise efficient algorithms (such as, for example, the Dijkstra algorithm). The disk resident assumption is a constraint that significantly affects the practical usability of otherwise efficient algorithms. This is particularly the case for graph and structural data because of the inability to effectively organize the underlying disk accesses to the different edges.

This disk-resident constraint has not been explored in most existing graph mining and management algorithms. In existing approaches where methods are designed for disk-resident data, those methods are either designed the use of specific location based properties of spatial databases, or for a graph generalization of the single-source distance thresholding query, which is different from the pairwise shortest-path problem described herein in connection with one or more embodiments of the invention.

Examples of relevant queries can include the following:

Determine the shortest path between two nodes.

Determine the shortest path labels from a given node to all other nodes.

For a given node, determine all other nodes for which the path is below a given threshold.

In memory-resident applications, the shortest path problem can be solved with the use of the Dijkstra's algorithm. For pairwise reachability, techniques can include using Dijkstra with the additional modification that the algorithm is terminated early when the desired destination vertex has been reached. While this is extremely efficient in the memory-resident case, the method does not work well in disk-resident applications because of the randomness in accessing different edges during the execution of the algorithm.

The Dijkstra algorithm works as follows. Begin by labeling the distance of the source node to 0. The edges emanating from a given node are examined and successively labeled with distance at most one greater than the current node. Therefore, for a given node, all possible edges exiting from the node are examined (for the undirected case, there is no distinction between entering and exiting nodes), and the closest nodes exiting from it are labeled. This process is repeated until all nodes are labeled. This algorithm is efficient in the case of memory-resident data because it can be shown that each edge is scanned at most twice during the course of the computation. This is, however, not the case for disk resident data, because the edges may need to be scanned from disk.

Many graph databases can be very large and may be of the order of several gigabytes. Further, in order to ensure sequential access of the edges for Dijkstra's algorithm, each edge would need to be stored twice; once for each node. This would double the time required for accessing the underlying edges. As a result, the computation process becomes extremely inefficient. One of the concerns is that user queries typically require real-time responses, and disk-resident processing simply cannot provide such a response, even when the underlying algorithm is efficient in memory-resident scenarios.

Accordingly, one or more embodiments of the invention implement an approach based on an uncertain probabilistic representation of the compressed graph. This provides a close approximation of the value of the shortest path between a pair of nodes. At the expense of a small amount of additional storage and processing, the approximated value can be tightened further along with a sequence of edges that represent the actual path.

As described herein, one or more embodiments of the invention include creating a compressed representation of an underlying network with the use of clustering techniques.

Further, these clustering techniques are used to approximate the nearest neighbor very closely, and a branch and bound technique can be used in conjunction with the clustering techniques to provide responses to queries.

One intuition in creating a compressed representation is that real graphs have considerable skew in the distribution of the edges. In particular, the global power law implies that most of the edges are incident on a relatively small fraction of the nodes. Such nodes form dense regions in the graph. Note, also, that while dense regions may contain a very large proportion of the edges, they contribute a disproportionately lower number of edges to paths between pairs of nodes. This is because edges which lie in sparse regions of the graph are often more critical to paths between nodes, as fewer alternative paths may exist. The shortest path distances between pairs of nodes in dense regions typically have properties such as, for example, those described below.

The diameter of such portions of a graph is often very small, whereas the number of edges is disproportionately large. For example, consider a dense clique (or dense "pseudo-clique") containing hundreds of nodes. In such cases, the all-pairs shortest-path distance within this group of hundreds of nodes may typically be a small number such as 3 or 4, whereas the total number of edges may range in the thousands.

Also, the variation in the shortest path distance between pairs of nodes is often quite small. For example, most pairwise shortest path distances may only be one or two in such cases. In fact, the distribution of all pairs-shortest path distances within this dense region can be represented by a compact probability-density function in the form of a histogram representation of a few buckets. Thus, the low variation in shortest path distances is helpful in creating a more compact representation of the underlying distribution of distances.

The above observations suggest, for example, a way to compact a large graph into a much smaller space without losing the underlying distributions of distances between pairs of nodes. The techniques detailed herein can determine important dense regions in the graph and compact them into special nodes. The shortest path is computed on this new compressed graph. Note that when paths pass through such special nodes, a probabilistic node distance penalty can be added to reflect the reachability distance of the sub-path within the super-node. The penalty is probabilistic because the set of nodes has already been compressed and the exact sequence of edges used by the path passing through this super-node is not known. The exact path distance within the super-node depends upon the exact entry and exit node of the sub-path within the graph representing the super-node. In order to re-construct the path, additional information about the compressed nodes can be stored on disk.

On the other hand, if the query is processed using the memory-resident structure only, then the shortest path distance is treated as a random variable which is dependent on the sum of the underlying edge lengths and node penalties. The probabilistic penalty for a node is estimated using the distribution of the all-pairs histogram probability representation, in which every possible entry and exit node is considered equally likely.

As described herein, the overall approach is to construct a compressed graph in a pre-processing step, and use it repeatedly for query processing. One or more embodiments of the invention assume that the input to the algorithm is the disk-resident graph G and further include processing the graph to create a main-memory resident graph G'. One or more embodiments of the invention also assume that the sub-graphs which are contracted into super-nodes are denoted by $L_1 \ldots L_k$. These are dense and node-disjoint sub-graphs of G. For each sub-graph $L_i$, one or more embodiments of the invention include applying an all-pairs shortest-path algorithm to determine the corresponding probability distribution of shortest paths through $L_i$. Note that because $L_i$ may be several orders of magnitude smaller than the original graph G in terms of the number of nodes, the all-pairs shortest path problem can be practically used on a contracted set of nodes in the pre-processing step.

The probability distribution of the all-pairs shortest paths of $L_i$ is stored in the histogram $H_i$. One observation is that the dense graph $L_i$ contains as many edges as the square of the number of nodes in $L_i$, whereas the histogram $H_i$ is extremely compact, and contains significantly fewer buckets than the total number of nodes in $L_i$. The larger the number of nodes in a contracted set, the better the compression factor. This probability distribution essentially represents the distance behavior of the sub-paths passing through the sub-graph $L_i$. Further, any sub-path of a shortest-path is also a shortest path between a different pair of nodes, and any shortest path which passes through this super-node will use some shortest path in $L_i$. The exact nature of the shortest (sub)-path for this super-node depends upon the exact entry and exit node in $L_i$. Therefore, the all-pairs probability distribution simply represents the corresponding stochastic behavior, if the simplifying assumption that any entry and exit node may be used with equal probability is made.

The query processing technique leverages the memory-resident compressed representation of the graph. Note that this compressed representation has uncertain node penalties, and therefore the shortest path algorithm can be appropriately modified. Because only the uncertain representation of the graph is available, one or more embodiments of the invention can include computing the shortest path only in terms of the probabilistic distance rather than the deterministic distance. This is defined in terms of a (histogram-based) probability distribution function of the distance of the path from the source node. This is also equal to the sum of the edge lengths and the probabilistic node penalties along the corresponding path.

In order to compare different choices of paths, one or more embodiments of the invention include selecting a measure of the probabilistic distance, which is minimized. For example, the average, the median, or the worst-case path length from this distance histogram can be used. Note that the choice of this probabilistic measure is orthogonal to the design of the query-processing algorithm. The main difference lies in how node penalties are computed from the underlying distance histograms.

The cost of a path is defined as the sum of the number of edges on the path in the compressed network G' along with a node penalty which is determined by sum of the expected reachability distance from each super-node histogram encountered on the corresponding path. One of the main properties that allow the design of efficient algorithms for the shortest path problem is the sub-path property, which implies that every sub-path of a shortest path is also a shortest path (between the corresponding pair of nodes). Note that this property continues to hold true for the expected case with probabilistic node penalties. The sub-path property facilitates designing an effective algorithm for finding the shortest path distance. Also, one or more embodiments of the invention assume that the histogram of node penalties associated with node r is denoted by T(r). In the event that r is not a super-node, the value of T(r) is a histogram with one bucket of value 0.

The shortest reachability method is a probabilistically modified version of the Dijkstra algorithm to deal with the node penalties. Each node i is associated with a probability histogram N(i) which denotes the histogram of possible shortest path distances from the source node to I for different shortest sub-path instantiations within the super-nodes. One or more embodiments of the invention can include beginning with the source node s and set its probabilistic distance label value to a 1-bucket histogram with a value of 0 in the event that it is not part of a super-node. In the event that s is part of a super-node, one or more embodiments of the invention include setting its probabilistic distance label to the corresponding node penalty histogram.

Additionally, one or more embodiments of the invention create a candidate-node list which (referred to herein as List). In each iteration, the node from List with the probabilistically smallest distance label is selected. The probabilistically smallest distance label is defined based on the desired measure on the distance histogram. These measures can be the expected distance from the histogram distribution, the median distance from the histogram, and/or the worst-case distance from the histogram. The choice of a particular measure does not affect the broad algorithmic approach. The only constraint is that the particular measure should be used consistently throughout the algorithm. In each iteration, one or more embodiments of the invention include determining the node with the (probabilistically) smallest distance label, and updating the histograms of the nodes that are adjacent thereto.

By way of illustration, let q be the current node being examined with distance histogram N(q). For any adjacent node r, one or more embodiments of the invention compute the probability histogram N(r) with the use of N(q) and T(r), and check if it is probabilistically smaller than the current value. The first step in such a process is to shift each bucket of the histogram N(q) by one in order to account for the edge (q, r). Next, the histogram density function is determined for the distribution represented by the sum of the random variables represented by P and T(r). This can be achieved by computing the probability for each bucket-combination between N(q) and T(r) and creating the composite distribution. For each bucket combination values $v_1$ in P and $v_2$ in T(r), the corresponding probabilities in P and T(r) are multiplied with one another and added to the bucket for $v_1+v_2$. This process is referred to herein as histogram convolution, and it represents the probability distribution for the sum of the two random variables. This composite distribution denotes the probabilistic cost of the shortest-path to node r which passes through (q, r). One or more embodiments of the invention include resetting N(r) to this value if it is (probabilistically) smaller than the current value of N(r). After all adjacent nodes of q have been scanned, any of these adjacent nodes are added to List if they have never been added to or deleted from List before. Also, node q is then deleted from List. This process can be repeated until List is empty, thereby providing the query labels for each node in the data.

One or more embodiments of the invention can also include modifying this query to determine all nodes whose reachability from the source node is below a given threshold. A difference exists in the criterion used for adding nodes to List. In this case, a node is not added to List if the best case distance to that node is no better than a given threshold. The above approach provides an estimate of the shortest path distance as well as a compressed representation of the approximate shortest path through a sequence of nodes and contracted super-nodes. However, in many practical applications, one or more embodiments of the invention may need to re-construct the actual paths in terms of the original nodes rather than the super-nodes. In order to achieve this goal, two pieces of information are stored, as described below.

The compressed graph does not contain information about the precise entry and exit points of the sub-paths within super-nodes. Therefore, one or more embodiments of to the invention include storing additional information about the entry and exit points of any edge for which either of its two vertices lie inside a super-node. This additional information is stored with the use of a disk-based hash table, referred to herein as an edge-mapping table. This additional information can be used to determine the possible entry and exit points within a given super-node from the shortest probabilistic path.

Additionally, one or more embodiments of the invention can also include explicitly storing the graph for each of the contracted super-nodes on disk. This information is referred to as the contracted graph mappings. Note that each such graph fragment is typically only a small region of the overall mapping, and typically represents a dense region of the overall graph.

Consider a compressed path P denoted by $i_1 \ldots i_k$, where any node $i_r$ may be a node or a super-node. For each edge ($i_j$, $i_{\{j+1\}}$) on this path, one or more embodiments of the invention use the disk-based edge-mapping table in order to determine the mapping of the super-nodes to possible entry and exit nodes. Then, the contracted graph mappings are used, along with the information about the entry and exit nodes, to expand the segments of the shortest paths within each contracted node. For each contracted graph mapping, the shortest path between the corresponding entry and exit node is determined. Because the individual graph mappings are likely to be relatively small, they can be read into main memory for shortest path computations within the contracted nodes.

To determine the dense sub-graphs, one or more embodiments of the invention include sampling the edges from the underlying graph. The connected components in these sampled edges are used as the dense sub-graphs. Note that this sampling process is naturally biased towards finding dense sub-graphs because the connected components in the sampled edges are biased towards being dense sub-graphs in the underlying data.

FIG. 1 is a diagram illustrating example architecture, according to an embodiment of the present invention. By way of illustration, FIG. 1 depicts a computer server 5 containing a central processing unit (CPU) 10, a memory 20, and a disk 30. The disk contains the network structure and data that is used to determine the important nodes. The processing of this network structure is performed in the CPU 10. Software components used to carry out the techniques detailed herein (for example, the steps depicted in FIGS. 2-5) are executed on the CPU. Also, the memory is used in order to cache the intermediate results which are required for the processing.

Further, the computations are performed at the CPU, and the intermediate results are stored in main memory. Some of the intermediate results (such as, for example, the compressed graph representation) are also stored on the disk 30.

Figure 2:
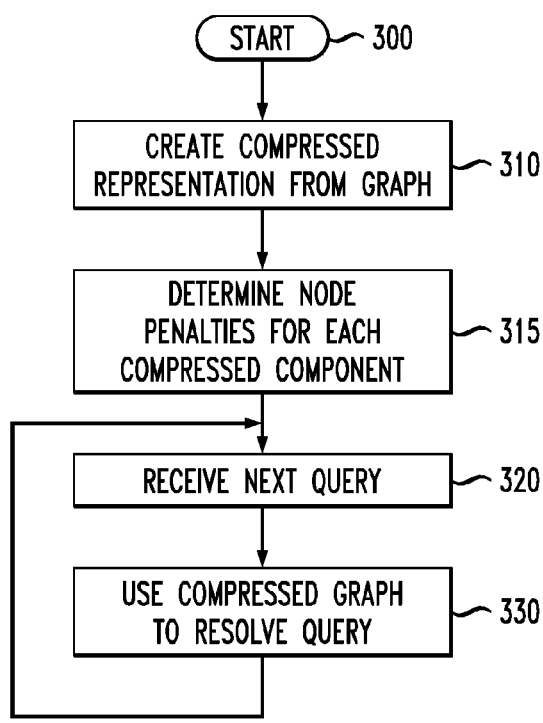
FIG. 2 is a flow diagram illustrating techniques for resolving a query, according to an embodiment of the present invention.

FIG. 2 is a flow diagram illustrating techniques for resolving a query, according to an embodiment of the present invention. Step 300 includes starting the techniques. Step 310 includes creating a compressed graph (that is, a compressed representation from a graph) for the query. This is a pre-processing step, the results of which are continuously used by the querying module. Step 315 includes determine the node penalties which are associated with each node. This is also a part of the pre-processing step for the algorithm. The node penalties are used to estimate effectively for future online query processing. After the pre-processing, one or more embodiments of the invention can include continuously executing a loop in which queries are received and resolved.

Step 320 includes receiving the next query from the user. Step 330 includes using the compressed graph to resolve this query. This process will be described in more detail in connection with FIG. 5. As noted, in one or more embodiments of the invention, steps 320 and 330 are executed in a continuous loop as more queries are continuously received and resolved. This continuous loop reflects the online portion which uses the pre-processed structure for real time query processing.

Figure 3:
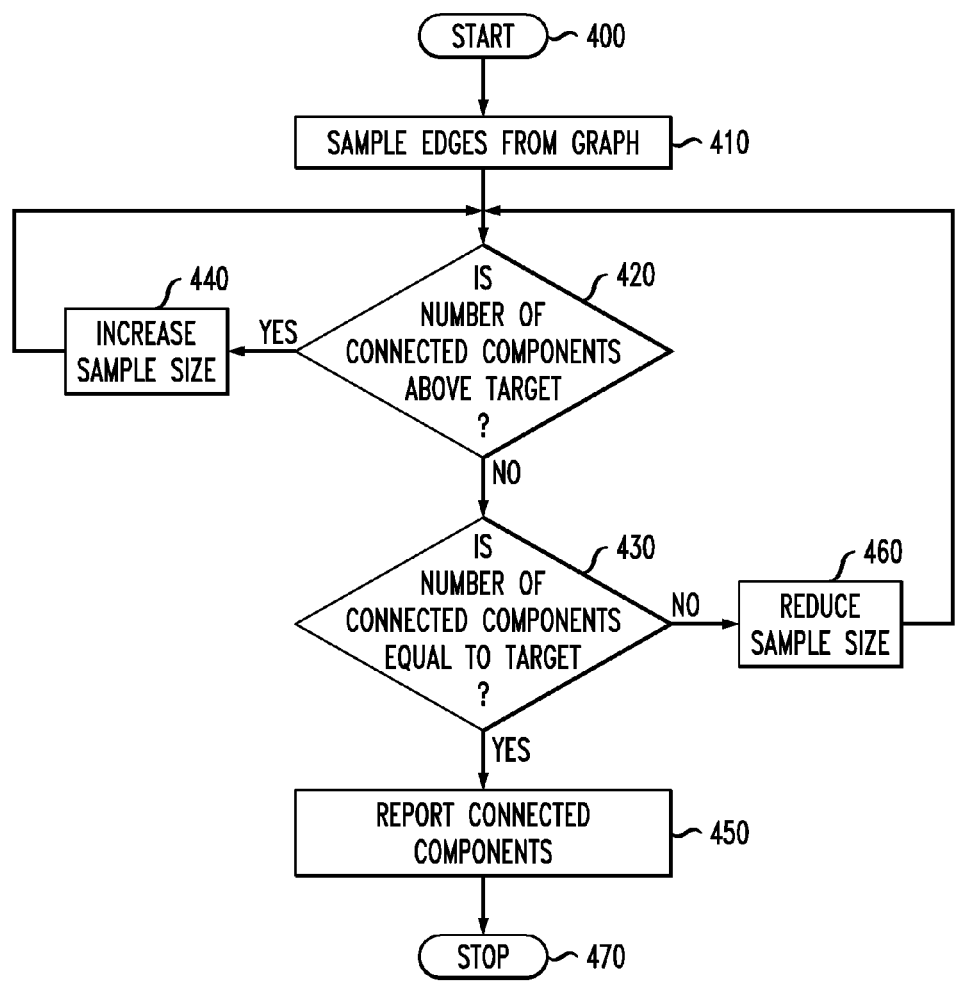
FIG. 3 is a flow diagram illustrating techniques for creating a compressed graph, according to an embodiment of the present invention.

FIG. 3 is a flow diagram illustrating techniques for creating a compressed graph, according to an embodiment of the present invention. FIG. 3 can be considered a detailed description of step 310 of FIG. 2, and is a description of the process of creation of the connected components in the graph with the use of sampling of the edges in the underlying graph. Note that a sample of the edges can create a set of connected components, each of which are likely to be dense in the original graph. This is because dense regions in the graph contain a large number of edges, and these regions tend to remain connected, even when a small percentage of the edges in the graph are sampled.

Note also that the number of connected components has an inverse relationship to the number of edges sampled. When a larger number of edges are sampled, the number of connected components reduces and vice-versa. Therefore, one or more embodiments of the invention include determining the correct number of sampled edges so that the number of connected components reduces.

In FIG. 3, step 400 includes starting the techniques. Step 410 includes sampling a pre-defined number of edges from the graph. This pre-defined number can be, for example, typically fixed at some small number (such as, for instance, 10). Once the sampling has been performed, step 420 includes determining if the number of connected components in the graph induced by the sampled edges is above a target. If the number of connected components is above the target, step 440 includes increasing the sample size in order to reduce the number of connected components. Otherwise, step 430 includes determining if the number of connected components is equal to the target. In such a case, step 450 includes reporting the current set of connected components as the relevant set.

On the other hand, if the number of connected components is below the target, step 460 includes reducing the number of edge samples to increase the number of connected components. This process is repeated in a loop over and over again, until the desired number of components is achieved. Additionally, step 470 includes stopping the techniques.

Further, in one or more embodiments of the invention, this approach can be repeated multiple times in order to achieve the best possible set of connected components. To achieve this goal, one or more embodiments of the invention can include defining an objective function associated with the connected components and optimizing this objective function over the different samples.

Figure 4:
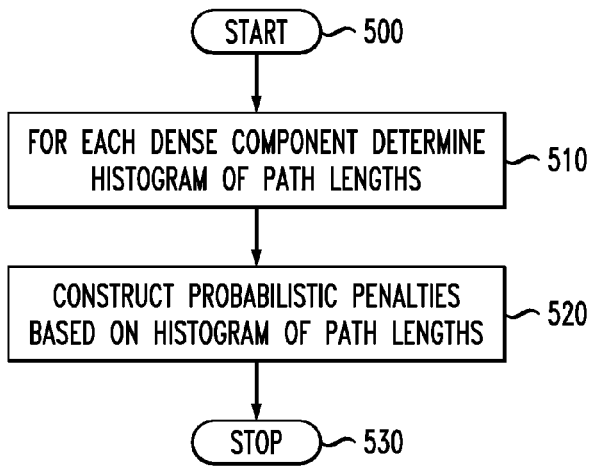
FIG. 4 is a flow diagram illustrating techniques for determining the node penalties for each compressed component, according to an embodiment of the present invention.

FIG. 4 is a flow diagram illustrating techniques for determining the node penalties for each compressed component, according to an embodiment of the present invention. FIG. 4 can be considered a detailed description of step 315 of FIG. 2, also as a part of the pre-processing steps for one or more embodiments of the invention. Step 500 includes starting the techniques.

Note that the node penalties account for the compressed portions of a graph, the paths through which cannot be estimated exactly. Therefore, these paths need to be estimated approximately. In order to do so, the frequency of the shortest paths in each connected component is tested. For each connected component, step 510 includes running the all-pairs shortest path problem and creating a histogram distribution of the shortest paths across the different nodes. Further, step 520 includes constructing a histogram of the distribution of path lengths. These represent the probability distribution of the penalties in the underlying data of connected components and terminate. Step 530 includes stopping the techniques.

Figure 5:
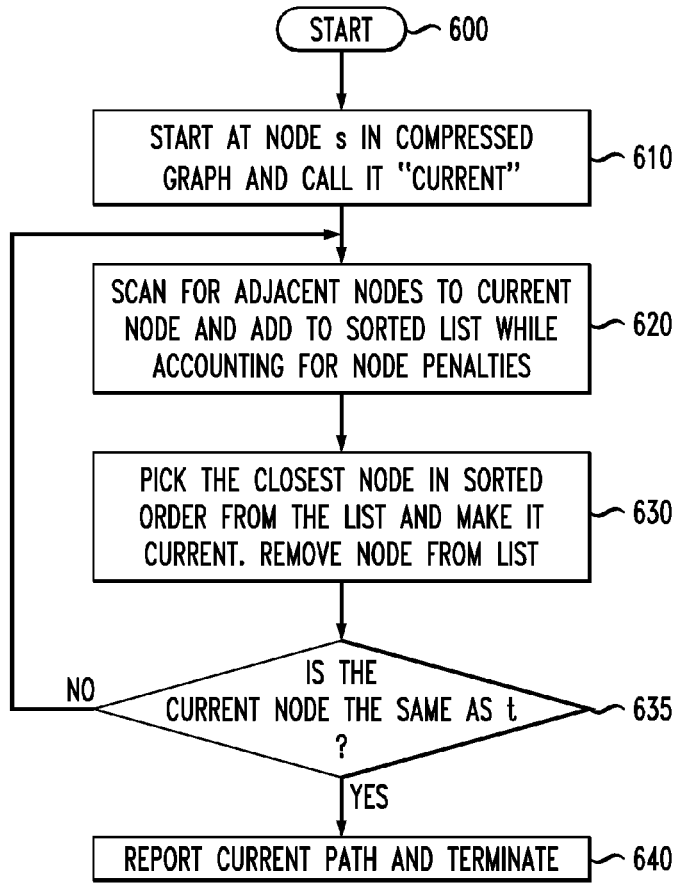
FIG. 5 is a flow diagram illustrating techniques for using the compressed graph for query processing, according to an embodiment of the present invention.

FIG. 5 is a flow diagram illustrating techniques for using the compressed graph for query processing, according to an embodiment of the present invention. FIG. 5 can be considered a detailed description of step 330 of FIG. 2. One or more embodiments of the invention assume a need to determine the nearest distance between source node s and the sink node t. Accordingly, step 600 includes starting the techniques.

Step 610 includes starting at the node s in the graph and calling it current. At the same time, one or more embodiments of the invention also maintain a list of candidate nodes for further exploration. Step 620 includes scanning the adjacent nodes to the current node, and adding them to list. This list is sorted by distance of the node from s. Note also that the distance from the node s additionally includes the probabilistic node penalties.

Step 630 includes selecting the closest node from LIST and making it the current node. This node is then removed from the corresponding LIST of nodes. Step 635 includes determining if the LIST is the destination node t. If this is not the case, the techniques return to step 620 and examine all of the adjacent nodes from the current node. On the other hand, if the current node is the destination node t, then this is a sign that the shortest path from the source node s to the sink node t has been determined. At this point, step 640 includes tracking back this shortest path from source node to sink node and terminate.

It is additionally noted that while the above description deals with the case of the determination of the shortest path between a particular pair of nodes, one or more embodiments of the invention can be extended to several variations of these queries. An example can include where there is a need to determine the shortest path to all nodes or to determine all nodes that are within a particular threshold of a query. All of these cases, by way of example, can be handled by the procedure depicted in FIG. 5, but with use of a different termination criterion. For example, in the first case, the termination criterion is that the algorithm terminates when LIST is empty and reports all of the relevant shortest paths. In the second case, the algorithm terminates when the distance to the first node in LIST exceeds the pre-determined threshold. All paths to nodes below the threshold are reported.

Figure 6:
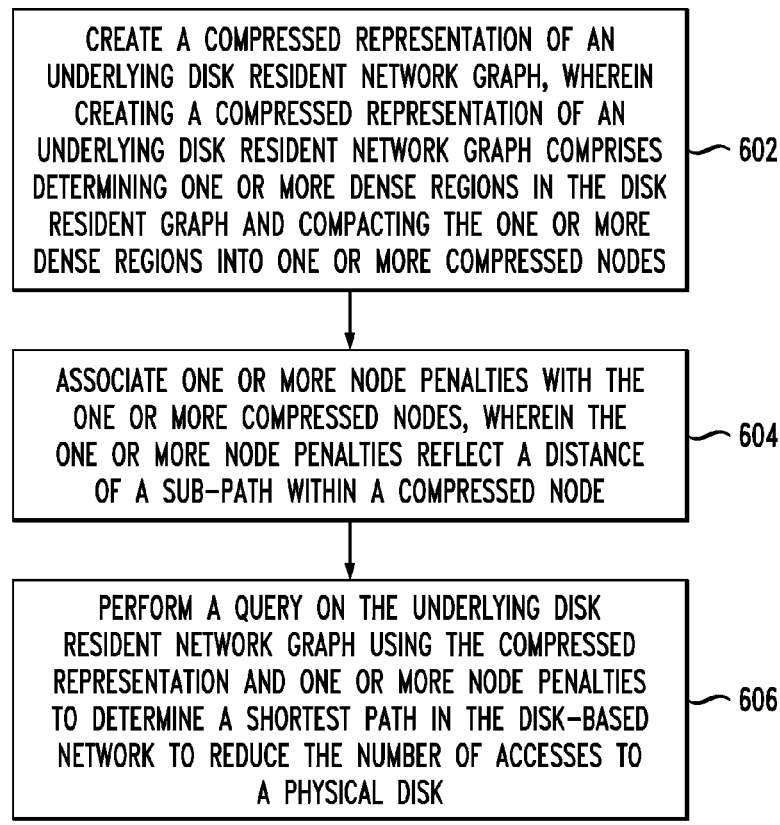
FIG. 6 is a flow diagram illustrating techniques for determining a shortest path in a disk-based network, according to an embodiment of the invention.

FIG. 6 is a flow diagram illustrating techniques for determining a shortest path in a disk-based network, according to an embodiment of the present invention. Step 602 includes creating a compressed representation of an underlying disk resident network graph, wherein creating a compressed representation of an underlying disk resident network graph comprises determining one or more dense regions in the disk resident graph and compacting the one or more dense regions into one or more compressed nodes. This step can be carried out, for example, using a software module and/or component executing on a hardware processor. Creating a compressed representation of an underlying network graph can include performing edge sampling. Additionally, each compressed component in the graph can be a connected component in the edge-sampled graph, and the number of sampled edges is determined so as to achieve a target number of components in the graph.

Also, in one or more embodiments of the invention, creating a compressed representation of an underlying network graph can include using density based compression as well as using one or more clustering techniques.

Step 604 includes associating one or more node penalties with the one or more compressed nodes, wherein the one or more node penalties reflect a distance of a sub-path within a compressed node. This step can be carried out, for example, using a software module and/or component executing on a hardware processor. A node penalty can be determined by using a pairwise shortest path distribution in the graph. The shortest path distribution is derived from a compressed segment of the graph and is specific to a particular compressed segment which is converted into a supernode. Further, a histogram of the node penalties can be constructed for the shortest path distribution.

Step 606 includes performing a query on the underlying disk resident network graph using the compressed representation and one or more node penalties to determine a shortest path in the disk-based network to reduce the number of accesses to a physical disk. This step can be carried out, for example, using a software module and/or component executing on a hardware processor. Determining a shortest path in the network can include, for example, performing a disk-based nearest neighbor search. In one or more embodiments of the invention, a selective expansion is performed in order to determine nearest neighbor distances. Additionally, selective expansion uses node penalties and a list of nodes with sorted probabilistic distances, wherein a node with a shortest distance is selected for selective expansion.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include any or all of the components shown in the figures and/or described herein. In one or more embodiments, the modules can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
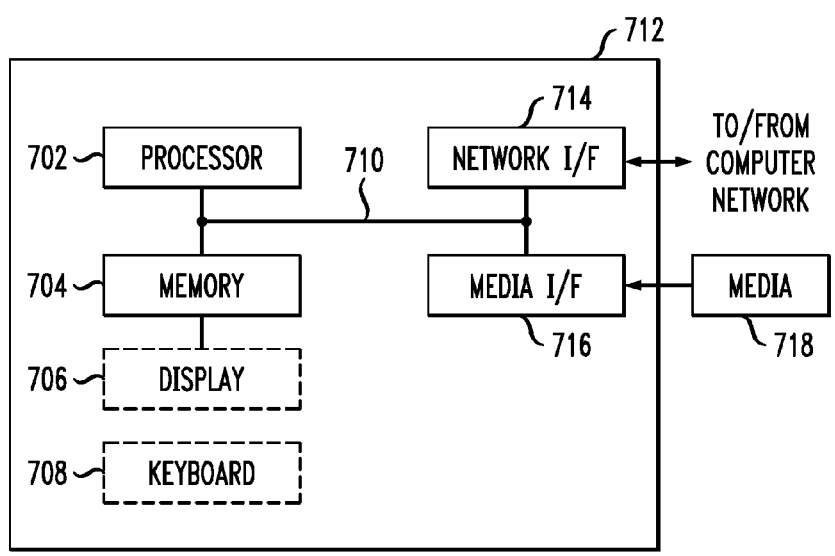
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components described herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, similarity searching with the use of density based compression.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for determining a shortest path in a disk-based network, wherein the method comprises:

creating a compressed representation of an underlying disk resident network graph, wherein creating the compressed representation of the underlying disk resident network graph comprises determining one or more dense regions in the disk resident graph and compacting the one or more dense regions into one or more compressed nodes;

associating one or more node penalties with the one or more compressed nodes, wherein the one or more node penalties reflect a distance of a sub-path within a compressed node; and performing a query on the underlying disk resident network graph using the compressed representation and one or more node penalties to determine a shortest path in the disk-based network to reduce the number of accesses to a physical disk, wherein determining the shortest path comprises performing a disk-based nearest neighbor search and performing a selective expansion to determine one or more nearest neighbor distances, wherein said selective expansion uses one or more node penalties and a list of nodes with sorted probabilistic distances.

2. The method of claim 1, wherein creating the compressed representation of the underlying network graph comprises performing edge sampling.

3. The method of claim 2, wherein each compressed component in the graph is a connected component in the edge-sampled graph.

4. The method of claim 2, further comprising determining a number of sampled edges so as to achieve a target number of components in the graph.

5. The method of claim 1, wherein creating the compressed representation of the underlying network graph comprises using density based compression.

6. The method of claim 1, wherein creating the compressed representation of the underlying network graph comprises using one or more clustering techniques.

7. The method of claim 1, further comprising determining a node penalty by using a pairwise shortest path distribution in the graph.

8. The method of claim 7, further comprising constructing a histogram of one or more node penalties for the shortest path distribution.

9. The method of claim 1, further comprising selecting a node with a shortest distance for selective expansion.

10. A computer program product comprising a tangible computer readable recordable storage medium including computer useable program code for determining a shortest path in a disk-based network, the computer program product including:
    computer useable program code for creating a compressed representation of an underlying network graph wherein creating the compressed representation of the underlying disk resident network graph comprises determining one or more dense regions in the disk resident graph and compacting the one or more dense regions into one or more compressed nodes;
    computer useable program code for associating one or more node penalties with the one or more compressed nodes, wherein the one or more node penalties reflect a distance of a sub-path within a compressed node; and
    computer useable program code for performing a query on the underlying disk resident network graph using the compressed representation and one or more node penalties to determine a shortest path in the disk-based network to reduce the number of accesses to a physical disk, wherein determining the shortest path comprises performing a disk-based nearest neighbor search and performing a selective expansion to determine one or more nearest neighbor distances, wherein said selective expansion uses one or more node penalties and a list of nodes with sorted probabilistic distances.

11. The computer program product of claim 10, wherein the computer useable program code for creating the compressed representation of the underlying network graph comprises computer useable program code for performing edge sampling.

12. The computer program product of claim 11, further comprising computer useable program code for determining a number of sampled edges so as to achieve a target number of components in the graph.

13. The computer program product of claim 10, wherein the computer useable program code for creating the compressed representation of the underlying network graph comprises computer useable program code for using density based compression.

14. The computer program product of claim 10, further comprising computer useable program code for determining a node penalty by using a pairwise shortest path distribution in the graph.

15. The computer program product of claim 14, further comprising computer useable program code for constructing a histogram of one or more node penalties for the shortest path distribution.

16. A system for determining a shortest path in a disk-based network, comprising:
    a memory; and
    at least one processor coupled to the memory and operative to:
        create a compressed representation of an underlying disk resident network graph, wherein creating the compressed representation of the underlying disk resident network graph comprises determining one or more dense regions in the disk resident graph and compacting the one or more dense regions into one or more compressed nodes;
        associate one or more node penalties with the one or more compressed nodes, wherein the one or more node penalties reflect a distance of a sub-path within a compressed node; and
        perform a query on the underlying disk resident network graph using the compressed representation and one or more node penalties to determine a shortest path in the disk-based network to reduce the number of accesses to a physical disk, wherein determining the shortest path comprises performing a disk-based nearest neighbor search and performing a selective expansion to determine one or more nearest neighbor distances, wherein said selective expansion uses one or more node penalties and a list of nodes with sorted probabilistic distances.

17. The system of claim 16, wherein the at least one processor coupled to the memory operative to create the compressed representation of the underlying network graph is further operative to perform edge sampling.

18. The system of claim 16, wherein the at least one processor coupled to the memory operative to create the compressed representation of the underlying network graph is further operative to use density based compression.

19. The system of claim 16, wherein the at least one processor is further operative to determine a node penalty by using a pairwise shortest path distribution in the graph.

20. The system of claim 1, wherein the at least one processor is further operative to construct a histogram of one or more node penalties for the shortest path distribution.

* * * * *